United States Patent
Miller

(10) Patent No.: US 10,070,224 B1
(45) Date of Patent: Sep. 4, 2018

(54) CROSSTALK CANCELLATION FOR BONE CONDUCTION TRANSDUCERS

(71) Applicant: Oculus VR, LLC, Menlo Park, CA (US)

(72) Inventor: Antonio John Miller, Sammamish, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/685,402

(22) Filed: Aug. 24, 2017

(51) Int. Cl.
- *H03G 5/00* (2006.01)
- *H04R 3/14* (2006.01)
- *H04R 1/02* (2006.01)
- *H04R 3/04* (2006.01)
- *G02B 27/01* (2006.01)

(52) U.S. Cl.
CPC .......... *H04R 3/14* (2013.01); *G02B 27/0172* (2013.01); *H04R 1/028* (2013.01); *H04R 3/04* (2013.01); *G02B 2027/014* (2013.01); *G02B 2027/0138* (2013.01); *G02B 2027/0178* (2013.01); *H04R 2460/13* (2013.01)

(58) Field of Classification Search
CPC . H04R 3/14; H04R 1/028; H04R 3/04; H04R 2460/13; G02B 27/0172; G02B 2027/0138; G02B 2027/014; G02B 2027/0178

USPC ............ 381/99, 151, 380, 71.1, 71.2–71.14; 345/8
See application file for complete search history.

(56) References Cited

U.S. PATENT DOCUMENTS

| | | | |
|---|---|---|---|
| 5,790,684 A * | 8/1998 | Niino ................... | H04M 1/6058 381/151 |
| 9,769,584 B1 * | 9/2017 | Norris ................... | H04S 1/002 |
| 9,774,979 B1 * | 9/2017 | Morishita ............ | H05K 999/99 |
| 2013/0156202 A1 * | 6/2013 | Hamacher ............ | H04R 25/453 381/23.1 |
| 2016/0217781 A1 * | 7/2016 | Zhong .................... | H04R 1/028 |

* cited by examiner

*Primary Examiner* — Vivian Chin
*Assistant Examiner* — Con P Tran
(74) *Attorney, Agent, or Firm* — Fenwick & West LLP

(57) ABSTRACT

Embodiments relate to crosstalk cancellation to reduce crosstalk vibrations during use of multiple bone conduction transducers. A system, for example, a head-mounted display (HMD) for providing audio to a user, uses vibration sensors to detect vibrations caused by the bone conduction transducers. In particular, a vibration sensor may generate an error signal representing residual vibrations due to crosstalk at a given ear region of the user. The system uses estimated transfer functions for noise propagation paths through the user's head to generate an anti-crosstalk signal. In response to the anti-crosstalk signal, a bone conduction transducer transmits anti-crosstalk vibrations that reduce the error signal at the given ear region.

19 Claims, 7 Drawing Sheets

CROSSTALK CANCELLATION FOR BONE CONDUCTION TRANSDUCERS

BACKGROUND

This disclosure relates generally to a hearing system and specifically relates to crosstalk cancellation in the hearing system.

Head mounted displays (HMDs) may be used to present virtual and/or augmented information to a user. For example, an augmented reality (AR) headset or a virtual reality (VR) headset can be used to simulate an augmented/virtual reality. Conventionally, a user of the AR/VR headset wears headphones to receive, or otherwise experience, the computer-generated sounds. However, wearing headphones suppresses sound from the real-world environment, which may expose the user to unexpected danger and also unintentionally isolate the user from the environment. Moreover, headphones separated from the outer casing or a strap of the HMD may be aesthetically unpleasing and may also be damaged through use.

Hence, in place of headphones, bone conduction transducers may be used in HMDs. The bone conduction transducers are positioned around the ears to generate vibrations, sends sound to the internal ear through the cranial bones. The bone conduction transducers can be made compact and be mounted on a strap or leg of the AR/VR headset for convenient use. However, using a pair of bone conductive transducers for both ears may result in crosstalk due to sharing of the user's cranial bones in the skull a common medium for transmitting the vibrations.

SUMMARY

Embodiments relate to a head-mounted display (HMD) including a first bone conduction transducer, a second bone conduction transducer, a first vibration sensor, a second vibration sensor, and a bone conduction signal generator. The first vibration sensor generates a reference signal representing first vibrations at a first ear region of a user caused by vibrations transmitted by the first bone conduction transducer. The second bone conduction transducer transmits first anti-crosstalk vibrations to a second ear region of the user in response to an anti-crosstalk signal. The second vibration sensor generates an error signal representing aggregate vibrations caused by the first vibrations and the first anti-crosstalk vibrations at the second ear region. For crosstalk cancellation, the bone conduction signal generator receives the reference signal and the error signal from the first and second vibration sensors, respectively. In particular, the bone conduction signal generator determines a first transfer function for a first noise propagation path of the first vibrations, and determines a second transfer function for a second noise propagation path of the second vibrations. The bone conduction signal generator generates a modified version of the anti-crosstalk signal by processing the reference signal and the error signal using the first and second transfer functions. Additionally, the bone conduction signal generator provides the modified anti-crosstalk signal to the second bone conduction transducer to transmit second anti-crosstalk vibrations that reduce the error signal at the second ear region.

Figure 1A:
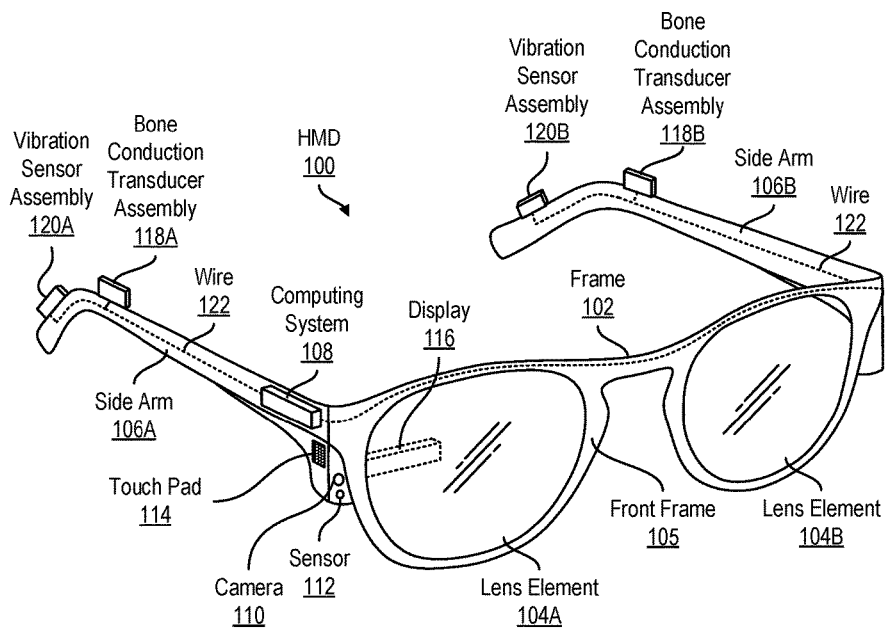
FIG. 1A is a perspective view of a head mounted display including bone transducer assemblies and vibration sensor assemblies, according to one embodiment.

The figures depict embodiments of the present disclosure for purposes of illustration only.

DETAILED DESCRIPTION

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments.

In the drawings, like reference numerals in the drawings denote like elements. The shape, size and regions, and the like, of the drawing may be exaggerated for clarity.

Embodiments relate to actively reducing or cancelling crosstalk vibrations resulting from the use of multiple bone conduction transducers that transmit vibrations in response to bone conduction signals. Anti-crosstalk signals are generated using transfer functions estimated based on vibrations detected at vibration sensor assemblies. Bone conduction transducer assemblies and vibration sensor assemblies may be included in a HMD and positioned at both sides of a user's head, for example, to provide spatial audio for the user.

Overview of Example System

Figure 1B:
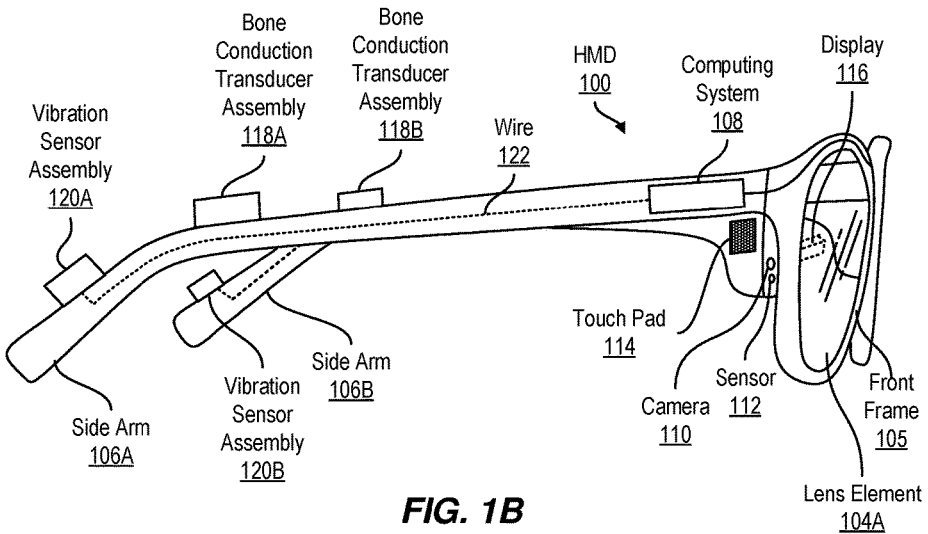
FIG. 1B is a side view of the head mounted display of FIG. 1A, according to one embodiment.

FIG. 1A illustrates a perspective view of a head mounted display (HMD) 100 including bone conduction transducer assemblies and vibration sensor assemblies, according to one embodiment. The HMD 100 includes a frame 102, a computing system 108, a camera 110, a sensor 112, a touch pad 114, a display 116, right and left bone conduction transducer assemblies 118A and 118B (hereinafter collectively referred to as "bone conduction transducer assemblies 118"), and right and left vibration sensor assemblies 120A and 120B (hereinafter collectively referred to as "vibration sensor assemblies 120"). FIG. 1B illustrates a side view of the HMD 100, according to one embodiment.

The frame 102 enables the HMD 100 to be secured to a user's head, more specifically, to a nose and ears of the user. In some configurations, the frame 102 is a solid structure and in other configurations, the frame 102 is a hollow structure (or a combination of solid and hollow structures). The frame 102 includes a front frame 105 securing right and left lens elements 104A and 104B (hereinafter collectively referred to as "lens elements 104") and right and left side arms 106A and 106B (hereinafter collectively referred to as "side arms 106"). The side arms 106 are connected to the front frame 105. When the HMD 100 is worn by the user, the side arms 106 are positioned behind the ears of the user of the HMD 100 and secure the HMD 100 to the user.

The lens elements 104 are made of materials that are at least partially transparent. Such lens elements 104 facilitate the user of the HMD 100 to engage in an AR environment where a projected image is superimposed over a real-world view as perceived by the user of the HMD 100 through the lens elements 104.

The computing system 108 may be hardware or a combination of hardware and software that performs various computation operations associated with the operation of the HMD 100. The operations performed by the computing system 108 include generating bone conduction signals and estimating transfer functions of noise propagation paths to compensate for crosstalk vibrations. The computing system 108 communicates with the bone conduction transducer assemblies 118 and the vibration sensor assemblies 120 over a wired network, for example via a wire 122, or a wireless network (e.g., BLUETOOTH®). As illustrated in FIG. 1A, the computing system 108 is positioned on the right side arm 106A. However, in alternate configurations, the computing system 108 may be on another part of the frame 102 (e.g., on the left side arm 106B), may be inside the frame 102 (e.g., inside the side arms 106), or may be located separate and remote from the HMD 100. The component and functions of the computing system 108 are further described below in detail with reference to FIG. 2.

The camera 110 is configured to capture image and/or videos. The camera 110 has a small form factor. As illustrated in FIG. 1A, the camera 110 is positioned in a front portion of the frame 102 near the right lens element 104A and the right side arm 106A. However, in alternate configurations, the camera 110 may be positioned in another part of the frame 102 (e.g., in a front portion of the frame 102 near the left lens element 104B and the left side arm 106B, in the right side arm 106A, in the left side arm 106B, in a middle portion of the front frame 105, and the like). In one embodiment, the camera 110 may cover a field of view that at least partially overlaps with the user's field of view seen through the lens elements 104.

The sensor 112 detects a position and movement of the HMD 100. The sensor 112 may include one or more of microphones, global positioning systems (GPS) sensors, magnetometers (compasses), gyroscopes, accelerometers, and the like. As illustrated in FIG. 1A, the sensor 112 is positioned in a front portion of the frame 102 near the right lens element 104A and the right side arm 106A. However, in alternate configurations, the sensor 112 may be positioned in another part of the frame 102 (e.g., in a front portion of the frame 102 near the left lens element 104B and the left side arm 106B, in the right side arm 106A, in the left side arm 106B, in a middle portion of the frame 102 between the right side arm 106A and the left side arm 106B, and the like).

The touch pad 114 receives user input associated with the operation of the HMD 100. For instance, the touch pad 114 may sense and resolve position and movement of an object (e.g., a finger of the user of the HMD 100). The touch pad 114 may use resistance sensing, capacitive sensing, surface acoustic wave sensing, pressure sensing, optical sensing, and the like. The touch pad 114 may provide tactile feed to the finger of the user when touches the touch pad 114. As illustrated in FIGS. 1A and 1B, the touch pad 114 is positioned in the right side arm 106A. In alternate configurations, the touch pad 114 may be positioned in another part of the frame 102 (e.g., in the left side arm 106B).

The display 116 projects, or otherwise displays, images and/or video to the user of the HMD 100. The display 116 may be a projector, a semi-transparent liquid crystal display (LCD), a light emitting diode (LED) display, an organic LED (OLED) display, and the like. As illustrated in FIG. 1A, the display 116 is inside the right lens element 104A. In alternate configurations, the display 116 may be positioned in another part of the frame 102 (e.g., inside the left lens element 104B). Although a single display 116 is illustrated, the HMD 100 may include additional displays 116. For example, the HMD 100 may include one or more displays 116 inside the right lens element 104A and one or more displays 116 inside the left lens element 104B.

Figure 1C:
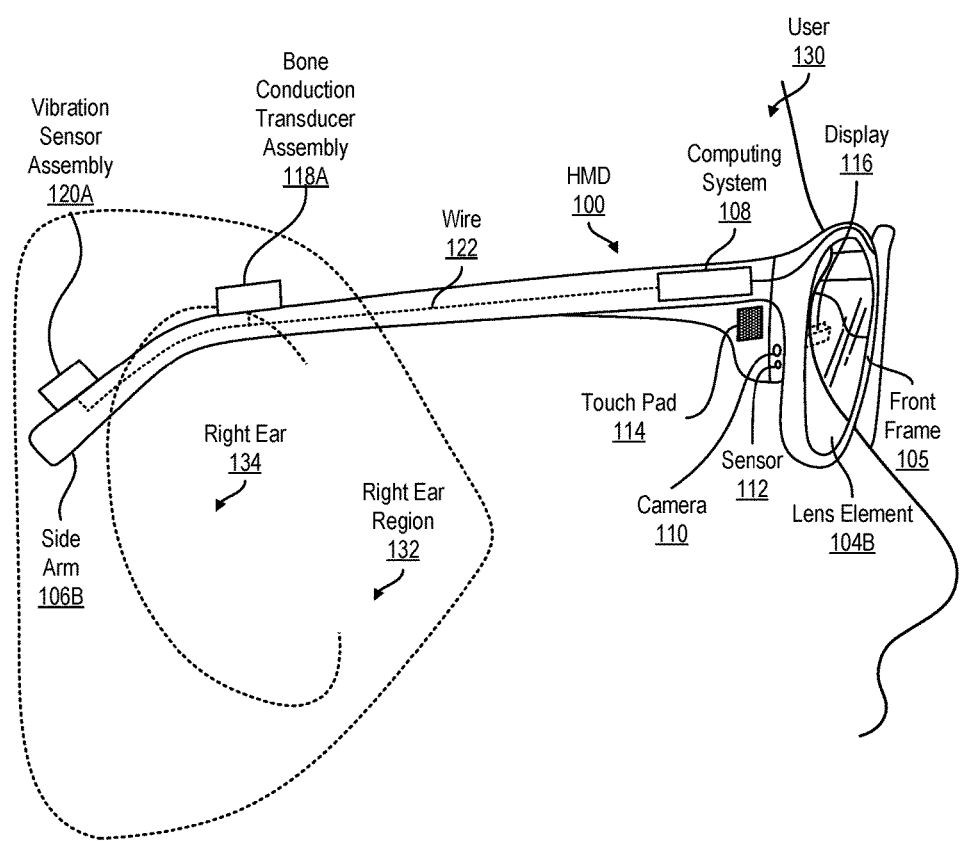
FIG. 1C is a side view of the head mounted display of FIG. 1A worn by a user, according to one embodiment.

FIG. 1C is a side view of the head mounted display of FIG. 1A worn by a user, according to one embodiment. The HMD 100 is secured to the user 130 by having the side arms 106 resiliently press against a right ear region 132 and a left ear region (not shown) of the user 130. The right ear region 132 includes a right ear 134, a right temporal bone (not shown) surrounding the right ear 134, and a patch of skin covering the right temporal bone. Similarly, the left ear region (not shown) includes a left ear, a left temporal bone surrounding the left ear, and a patch of skin covering the left temporal bone. The temporal bones are situated at a side and base of a skull of the user 130 and house structures of the ears (e.g., middle and inner ear). In one embodiment, the right side arm 106A is positioned behind the right ear 134 of the user 130 and comes into contact with the right ear region 132 of the user 130. Similarly, the left side arm 106B is positioned behind the left ear (not shown) of the user 130 and comes into contact with the left ear region (not shown) of the user 130.

The bone conduction transducer assemblies 118 transmit bone conduction vibrations to the temporal bones of the user 130. The bone conduction transducer assemblies 118 come into contact with patches of skin of the user 130. Specifically, the right bone conduction transducer assembly 118A comes into contact with a patch of skin covering the right temporal bone in the right ear region 132. Similarly, the left bone conduction transducer assembly 118B comes into contact with a patch of skin covering the left temporal bone in the left ear region. The bone conduction transducer assemblies 118 are further described with respect to FIG. 3A. Although FIG. 1C illustrates the right bone conduction transducer assembly 118A coming into a patch of skin above the right ear 134, the bone conduction transducer assembly 118A can be placed in other regions of the right ear region 132 such as a back of the right ear 134 or a bottom of the right ear 134.

The vibration sensor assemblies 120 come into contact with patches of skin of the user to detect the bone conduction vibrations resulting from one or both bone conduction transducer assemblies. Specifically, the right vibration sensor assembly 120A comes into contact with a patch of skin covering the temporal bone in right ear region 132. Similarly, the left vibration sensor assembly 120B comes into contact with a patch of skin covering the temporal bone in left ear region. The vibration sensor assemblies 120 are further described with respect to FIG. 3B.

Figure 1D:
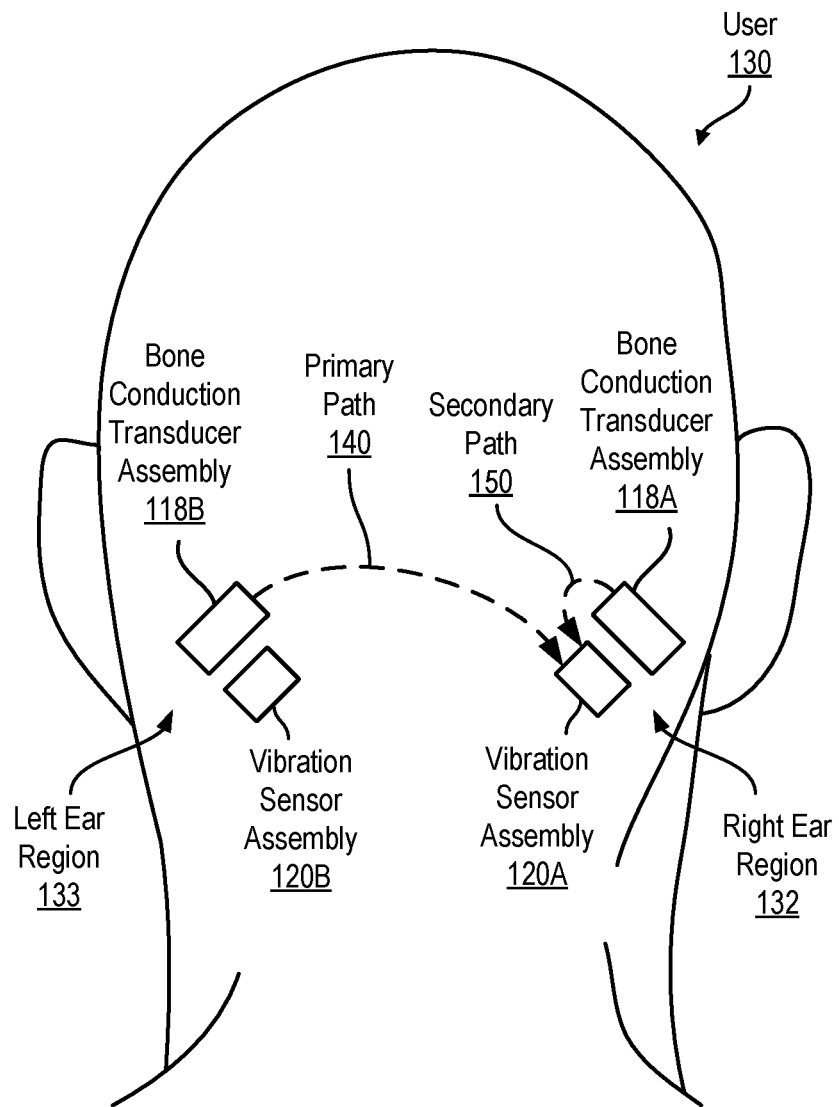
FIG. 1D is a diagram of noise propagation paths within a medium of cranial bones of a user, according to one embodiment.

FIG. 1D is a diagram of noise propagation paths within a medium of cranial bones of a user 130, according to one embodiment. The bone conduction transducer assemblies 118A and 118B are positioned on a right ear region 132 and left ear region 133 of the user 130, respectively. Additionally, the vibration sensor assemblies 120A and 120B are positioned on the right ear region 132 and left ear region 133 of the user 130, respectively. Other components of the HMD 100 are not shown in FIG. 1D for purposes of clarity, and the example illustrated in FIG. 1D is a back view of the user's 130 head.

The bone conduction vibrations may include right vibrations and left vibrations intended to be heard ideally only by the right ear and left ear, respectively, of a user wearing the HMD 100. The right vibrations are generated by the right bone conduction transducer 118A and the left vibrations are generated by the left bone conduction transducer assembly 118B. However, crosstalk may occur between the right vibrations and the left vibrations because both vibrations share the same medium of cranial bones in the skull of the user as their path to the left and right ear regions 132 and 133. Due to such crosstalk, some of the right vibrations can be heard by the left ear and some of the left vibrations may be heard by the right ear. For instance, some of the left vibrations ("crosstalk vibrations") generated by the bone conduction transducer assembly 118B also travels along the primary path 140 (or "crosstalk path") to the right ear region 132. Among other issues, such crosstalk makes it difficult for the user of the HMD 100 to localize spatial sound and degrades the overall experience.

The computing system 108 may improve the quality of audio provided to the user 130 by performing crosstalk cancellation. In some embodiments, crosstalk cancellation includes processing both "cross noise" and "local noise" (or "residual noise"). The cross noise includes crosstalk vibrations caused by a reference signal that travel along the primary path 140, while the local noise is caused by an error signal travels along a secondary path 150 in the right ear region 132. The vibration sensor assembly 120A detects the cross noise originating from the left ear region 133, and the vibration sensor assembly 120A also detects the local noise originating from the right ear region 132. By processing the detected noises to estimate transfer functions of various noise propagation paths (further described below with respect to FIG. 1E and FIG. 2), the computing system 108 determines and provides an anti-crosstalk signal to the bone conduction transducer assembly 118A. In response to receiving the anti-crosstalk signal, the bone conduction transducer assembly 118A transmits anti-crosstalk vibrations that reduce or cancel the crosstalk vibrations perceived by the user 130 in the right ear region 132. The computing system 108 can also simultaneously, or separately, perform crosstalk cancellation to compensate crosstalk in the left ear region 133.

Figure 1E:
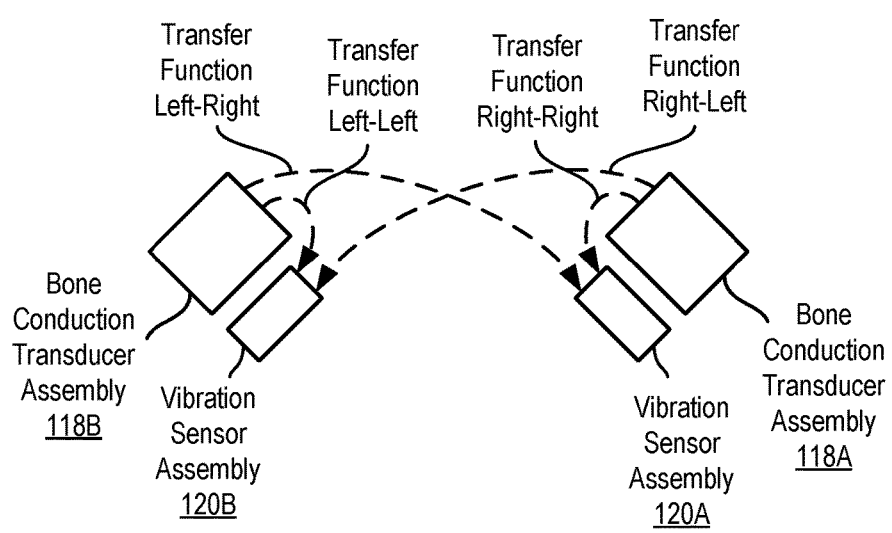
FIG. 1E is a diagram of transfer functions for various noise propagation paths corresponding to estimated transfer functions, according to one embodiment.

FIG. 1E is a diagram of various noise propagation paths corresponding to estimated transfer functions, according to one embodiment. In some embodiments, the computing system 108 may determine estimated transfer functions for noise propagating through cranial bones of a user along the primary path 140 and the secondary path 150 (as previously illustrated in FIG. 1D), caused by both the left bone conduction transducer assembly 118B and right bone conduction transducer assembly 118A. In particular, "transfer function left-right" ($TF_{LR}$) corresponds to noise propagating from the left bone conduction transducer assembly 118B to the right vibration sensor assembly 120A, "transfer function left-left" ($TF_{LL}$) corresponds to noise propagating from the left bone conduction transducer assembly 118B to the left vibration sensor assembly 120B, "transfer function right-right" ($TF_{RR}$) corresponds to noise propagating from the right bone conduction transducer assembly 118A to the right vibration sensor assembly 120A, and "transfer function right-left" ($TF_{RL}$) corresponds to noise propagating from the right bone conduction transducer assembly 118A to the left vibration sensor assembly 120B.

Example Computing System

Figure 2:
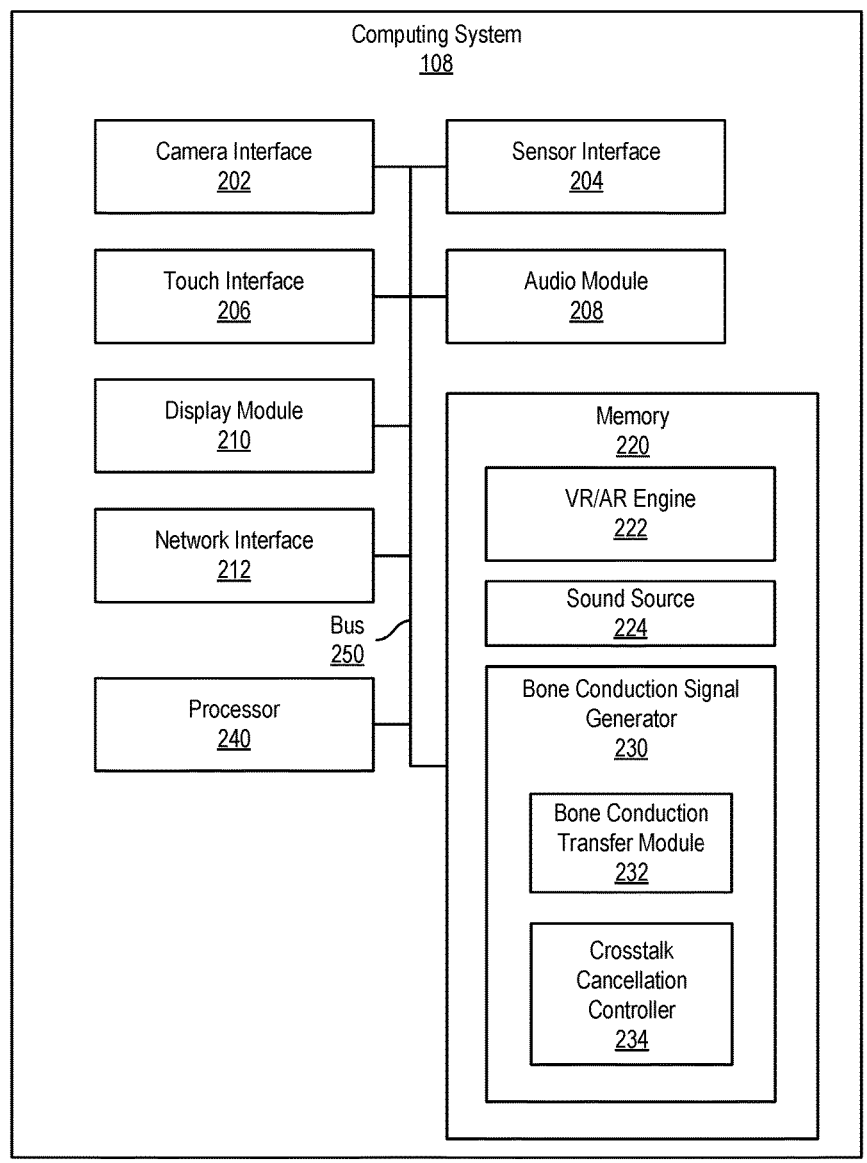
FIG. 2 is a block diagram of a computing system for performing crosstalk cancellation, according to one embodiment.

FIG. 2 is a block diagram of a computing system 108 for crosstalk cancellation, according to one embodiment. The computing system 108 includes, among others, a camera interface 202, a sensor interface 204, a touch interface 206, an audio module 208, a display module 210, a network interface 212, a memory 220, a processor 240, and a bus 250 connecting these components. The processor 240 executes instructions stored in the memory 220.

The camera interface 202 is configured to interface with the camera 110. The camera interface 202 may store images and/or videos captured by the camera 110 in the memory 220. The camera interface 202 may process (e.g., transcode) the images and/or videos captured by the camera 110.

The sensor interface 204 is configured to interface with the sensor 112. The sensor interface 204 may store sensor data corresponding to the position and movement of the HMD 100 detected by the sensor 112 in the memory 220.

The touch interface 206 is configured to interface with the touch pad 114. The touch interface 206 may store sensor data corresponding to user input received by the touch pad 114 and associated with the operation of the HMD 100 in the memory 220.

The audio module 208 is configured to interface with an audio source (e.g., sound source 224) and an audio sink (e.g., bone conduction transducer assemblies 118). The audio module 208 may receive a sound signal from the audio source, process the received sound signal, and transmit the processed sound signal to the audio sink.

The display module 210 is configured to interface with a video source (e.g., the VR/AR engine 222) and a display (e.g., the display 116). The display module 210 may receive a video signal from the video source and may transmit the video signal to the display.

The network interface 212 is configured to communicatively connect the computing system 108 to external systems, such as an audio source, a video source, a reality engine, and the like. The network interface 212 may communicate over the Internet, over a LAN, a WAN, a mobile wired or wireless network, a private network, a virtual private network, or a combination thereof.

The memory 220 is a non-transitory computer-readable storage medium storing, among others, a virtual/augmented reality (VR/AR) engine 222, a sound source 224, and a bone conduction signal generator 230. The memory 220 also includes software components not illustrated in FIG. 2 such as an operation system (OS).

The VR/AR engine 222 generates video data for sending to the display module 210, audio data for sending to the audio module 208 and peripheral data for sending to other user interface devices to provide the sense of virtual or augmented reality to the user. In one embodiment, the VR/AR engine 222 receives information from the camera via the camera interface 202, the sensors via the sensor interface 204, and the touch pad via the touch interface 208. Based on the received information, the VR/AR engine 222 determines audio data, video data and peripheral data to be provided to the user of the HMD 100. In a virtual reality scenario, for example, if the HMD 100 detects turning of the user's head to the right or left, the VR/AR engine 222 generates and sends images corresponding to the right side view or left side view to the display module 210 and correspondingly changed audio data to the audio module 208. In an augmented reality scenario, for example, if the HMD 100 detects that the user looked to the left or right, the VR/AR engine 222 provides audio and video data to the audio module 208 and the display module 210 that mirrors the user's movement in an augmented environment.

The sound source 224 provides, to the VR/AR engine 222, a sound signal. The sound source 224 may, for example, be an application program (e.g., gaming program), sound signals detected from the user's environment, audio data received from a remote source via a network interface 212.

The bone conduction signal generator 230 generates bone conduction signals corresponding to a sound signal from the VR/AR engine 222. The bone conduction signals include vibration signals representing vibrations to be transmitted by the bone conduction transducer assemblies 118. The bone conduction signal generator 230 includes a bone conduction transfer module 232 and a crosstalk cancellation controller 234.

The bone conduction transfer module 232 is a software module for generating bone conduction signals that result in stereo or spatial audio when applied to left and right bone conduction transducers 118. In one embodiment, the bone conductive transfer module 232 uses head-related transfer functions (HRTFs) to process the sound signal and generate a right vibration signal for the right bone conduction transducer 118A and a left vibration signal for the left bone conduction transducer 118B. The right and left vibration signals may be digital signals. As a result of processing by the bone conductive transfer module 232, the user of the HMD 100 may perceive the sound (resulting from the vibrations generated by the bone conduction transducer assemblies 118) as originating from a certain spatial location. For this purpose, the VR/AR engine 222 may provide spatial location information indicating a 2D or 3D location from which the user should perceive the sound as being originated.

The crosstalk cancellation controller 234 processes vibrations generated by the bone conduction transducer assemblies 118 to perform crosstalk cancellation. Further, the crosstalk cancellation controller 234 may estimate transfer functions corresponding to various propagation paths in a skull of a user (as previously shown in FIG. 1E) using spectral estimation, curve fitting, polynomial regression, Fourier transforms, adaptive filtering, or any other suitable technique for determining transfer function coefficients. The crosstalk cancellation controller 234 uses the estimated transfer functions to generate anti-crosstalk signals. In an embodiment, the crosstalk cancellation controller 234 uses four transfer functions, $TF_{LL}$, $TF_{LR}$, $TF_{RR}$, and $TF_{RL}$, as illustrated in FIG. 1E to generate anti-crosstalk signals for cancelling crosstalk in the left and/or right ear regions.

In addition, the crosstalk cancellation controller 234 may perform initial or online calibration to determine the estimated transfer functions. In an example initial calibration process, the crosstalk cancellation controller 234 retrieves baseline calibration data, e.g., mean/average calibration data for a sample population of users, to estimate transfer functions. As another example, the crosstalk cancellation controller 234 performs a calibration sequence by providing instructions to the user to determine quality of a HMD 100 fitting, e.g., adjusting the HMD 100 on the head of the user such that the user perceives satisfactory audio quality from the bone conduction transducer assemblies 118.

In some embodiments, the crosstalk cancellation controller 234 performs calibration each time a user 130 wears the HMD 100 to account for variations in the fitting of the HMD 100. For instance, the particular position or orientation of the HMD 100 on the head of the user 130 may shift from fitting-to-fitting, which may change a quality of physical contact between the skin of the user 130 near an ear region and a bone conduction transducer assembly 118 or a vibration sensor assembly 120. In another embodiment, the crosstalk cancellation controller 234 periodically detects an error of the estimated transfer functions and performs recalibration responsive to determining that the detected error is greater than a threshold error. The error may change, for example, due to shifting of the HMD 100 on the user 130 during a session. Thus, the crosstalk cancellation controller 234 may turn on a feedback loop to iteratively update coefficients of the estimated transfer functions in order to reduce the detected error, and thus mitigate distortions in audio perceived by the user 130. As another example, the crosstalk cancellation controller 234 may perform calibration responsive to determining that a signal detected by a vibration sensor assembly 120 has a signal-to-noise ratio that is greater than a threshold value.

In an embodiment, the crosstalk cancellation controller 234 may use one or more adaptive filters to characterize the vibrations. Each adaptive filter may include one or more coefficients (i.e., parameters) that can be adapted in real-time while a user 130 is listening to audio using the HMD 100, e.g., as part of a VR or AR experience. The crosstalk cancellation controller 234 may train adaptive filters for the left and right bone conduction transducer assemblies 118 simultaneously or separately. In one embodiment, the same adaptive filter is used for crosstalk cancellation of both bone conduction transducer assemblies 118. In other embodiments, separate adaptive filters with different coefficients may be used for the right bone conduction transducer assembly 118A and the left bone conduction transducer assembly 118B. Further, the crosstalk cancellation controller 234 may use different adaptive filters to process noise caused by reference signals and error signals, because both of these signals can independently change over time.

In some embodiments, the crosstalk cancellation controller 234 implements adaptive filtering using local noise detected along a secondary path, e.g., using a filtered-X least mean squares (LMS) algorithm or other types of algorithms. Referring back to FIG. 1D, in addition to the cross noise propagating through the primary path 140, the user may also perceive local noise propagating through the secondary path 150 at a given ear region. By merely detecting and providing the cross noise as input to a linear filter, the crosstalk cancellation controller 234 may not necessarily be able to generate an anti-crosstalk signal that also compensates for the local noise. However, the crosstalk cancellation controller 234 can iteratively update coefficients of the adaptive filter to reduce an error signal (e.g., a cost function) such as the local noise. Further, the crosstalk cancellation controller 234 may use the LMS algorithm estimate an impulse response of the cross noise (a reference signal) for updating the coefficients. In contrast to the linear filter, the adaptive filter can generate anti-crosstalk signals having frequency components that correspond to frequency components of the local noise, including any low frequency noise that the linear filter is not able to compensate. For instance, the anti-crosstalk signal may have a phase that is opposite to the phase of the local noise, e.g., the anti-crosstalk signal has a same frequency as the local noise but are out of phase with each other (up to 180 degrees). Thus, anti-crosstalk vibrations transmitted by the right bone conduction transducer assembly 118A will cancel, or at least reduce, the vibrations from the local noise due to superposition.

In some embodiments, the crosstalk cancellation controller 234 uses a feedforward adaptive filter that estimates a transfer function of noise caused by a reference signal transmitted from one side of the user's head to the other. For example, if the reference signal originates from the left side, the transfer function accounts for digital-to-analog (D/A) conversion of the reference signal, amplification of the reference signal (e.g., by a bone conduction transducer assembly 118), a left bone conduction transducer, skin impedance on the left side, bone vibration propagation from the left to right side of the head, skin impedance on the right side, a right vibration sensor, and analog-to-digital (A/D) conversion of the detected vibrations. In the same example, another adaptive filter that estimates a transfer function of noise caused by an error signal on the right side of the head also accounts for the aforementioned parameters, as well as a local vibration loop from a right bone conduction transducer to the right vibration sensor (e.g., the secondary path 150).

Example Bone Conduction Transducer Assembly

Figure 3A:
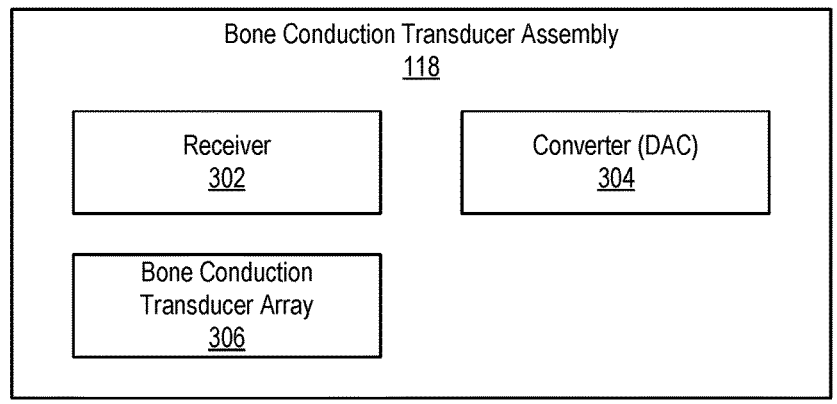
FIG. 3A is a block diagram of a bone transducer assembly, according to one embodiment.

FIG. 3A illustrates a bone conduction transducer assembly 118, according to one embodiment. The bone conduction transducer assembly 118 may include, among other components, a receiver 302, a converter 304, and a bone conduction transducer array 306.

The receiver 302 is a hardware or hardware in combination with software that receives, from the computing system 108, a bone conduction signal representing vibrations to be reproduced by the bone conduction transducer array 306 using a communication protocol. The communication protocol may be a standard protocol or communication protocol specifically developed for communicating the bone conduction signal. The bone conduction signal may be a digital signal.

The converter 304 is a hardware or a hardware in combination with software that generates an analog voltage signal corresponding to the bone conduction signal. The converter 304 may be a digital-to-analog converter (DAC). The converter 304 receives the bone conduction signal in a digital format and converts the signal into an analog signal.

The bone conduction transducer array 306 receives the analog voltage signal from the DAC 304 and generates vibrations transmitted to the ears of the user of the HMD 100 via the cranial bones of the user. For this purpose, the bone conduction transducer array 306 comes into contact with a patch of skin of the user of the HMD 100. The bone conduction transducer array 306 includes one or more bone conduction transducers.

Example Vibration Sensor Assembly

Figure 3B:
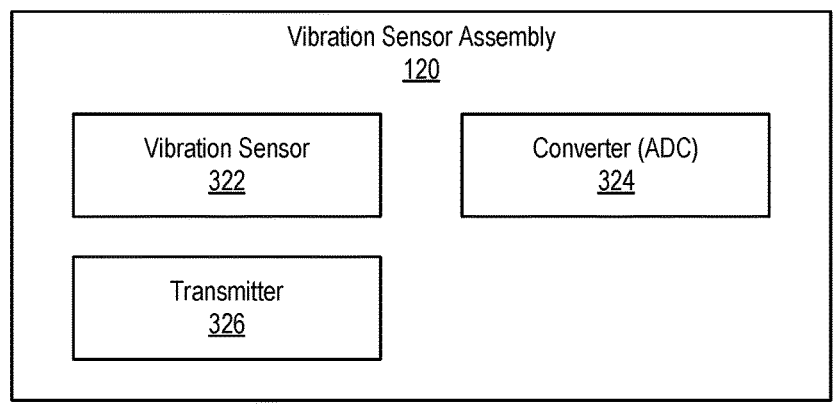
FIG. 3B is a block diagram of a vibration sensor assembly, according to one embodiment.

FIG. 3B illustrates a vibration sensor assembly 120, according to one embodiment. The vibration assembly 120 includes a vibration sensor 322, a converter 324, and a transmitter 326. The vibration sensor assembly 120 detects vibration and sends data on the detected vibration to the computing system 108 for adaptive filtering to cancel or reduce the detected vibrations.

The vibration sensor 322 detects vibrations and generates an analog signal representing the detected vibrations. The vibration sensor 322 may detect the vibrations responsive to transmitting of vibrations by a bone conduction transducer. For this purpose, the vibration sensor 322 comes into contact with a patch of skin of the user of the HMD 100.

The converter 324 generates a sensor signal representing the vibrations detected by the vibration sensor 322. The converter 324 may be an analog-to-digital converter (ADC) to convert analog version of the sensor signal into a digital sensor signal for transmitting to the computing system 108.

The transmitter 326 transmits, to the computing system 108, the sensor signal generated by the converter 324. The transmitter 326 may embody standard or customized communication protocol to communicate the digital sensor signal to the computing system 108.

Example Process Flow

Figure 4:
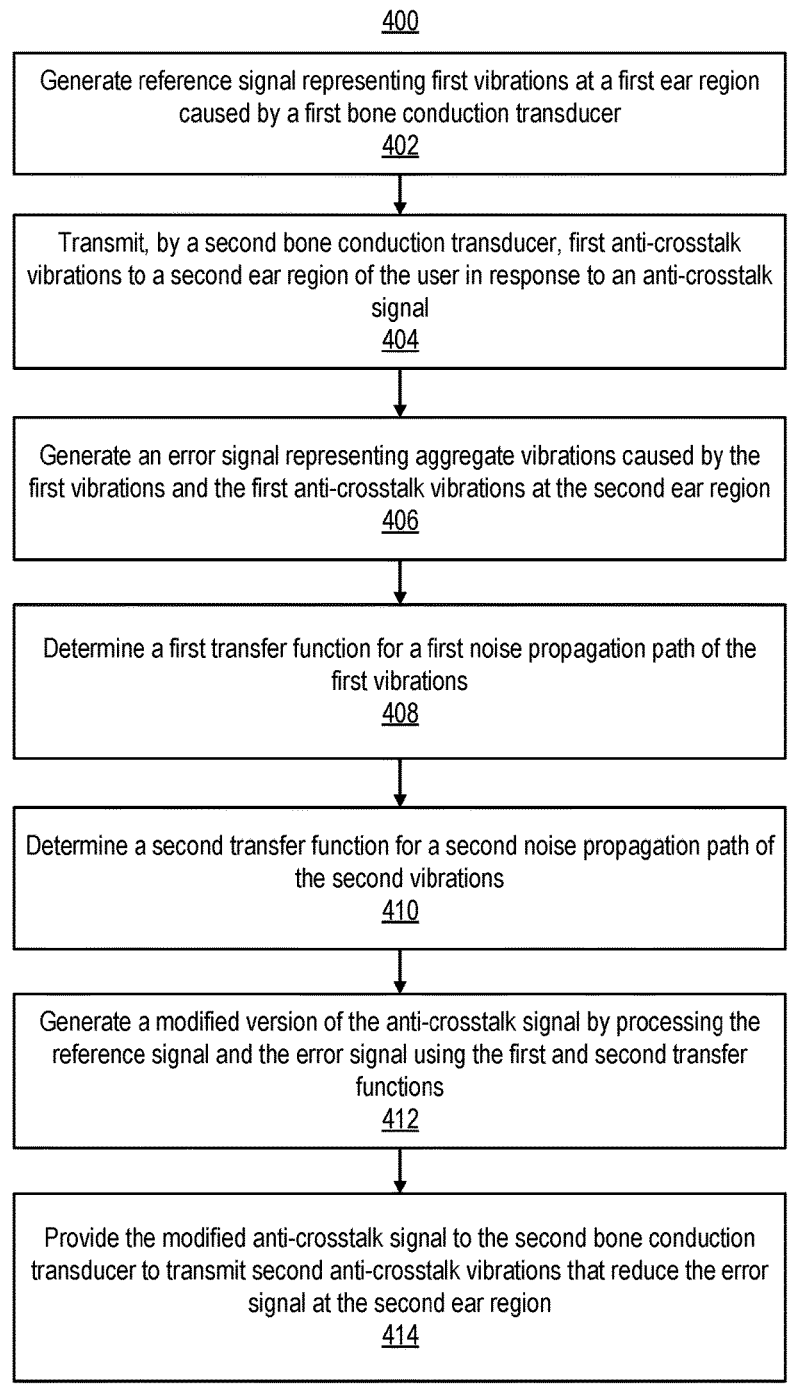
FIG. 4 is a flow chart of a process for crosstalk cancellation, according to one embodiment.

FIG. 4 is a flow chart of a process 400 for crosstalk cancellation, according to one embodiment. Reference will be made to FIG. 1D in the description below. A first bone conduction transducer (e.g., part of the bone conduction transducer assembly 118B) transmits vibrations intended for a first ear region of a user (e.g., the left ear region 133). However, the transmission of vibrations is not isolated to the first ear region, but also transmits through the user's skull to a second ear region (e.g., the right ear region 132), resulting in crosstalk vibrations. A first vibration sensor (e.g., part of the vibration sensor assembly 120B) generates 402 a reference signal representing first vibrations at the first ear region caused by vibrations transmitted by the first bone conduction transducer.

A second bone conduction transducer (e.g., part of the bone conduction transducer assembly 118A) transmits 404 first anti-crosstalk vibrations to the second ear region in response to an anti-crosstalk signal. The first anti-crosstalk vibrations are intended to cancel at least some of the crosstalk vibrations. However, not all of the crosstalk vibrations may be canceled, which results in residual vibrations due to the crosstalk. Thus, a second vibration sensor (e.g., part of the vibration sensor assembly 120A) generates 406 an error signal representing aggregate vibrations caused by the first vibrations and the first anti-crosstalk vibrations at the second ear region. The vibration sensor assemblies 120 may transmit the reference signal and the error signal to the computing system 108.

The crosstalk cancellation controller 234 of the computing system 108 determines 408 a first transfer function for a first noise propagation path (e.g., the primary path 140 in FIG. 1D) of the first vibrations (e.g., cross vibrations). The crosstalk cancellation controller 234 determines 410 a second transfer function for a second noise propagation path (e.g., the secondary path 150 in FIG. 1D) of the second vibrations (e.g., local vibrations). The crosstalk cancellation controller 234 generates 412 a modified version of the anti-crosstalk signal by processing the reference signal and the error signal using the first and second transfer functions. The crosstalk cancellation controller 234 provides 414 the modified anti-crosstalk signal to the second bone conduction transducer to transmit second anti-crosstalk vibrations that reduce or cancel the error signal at the second ear region. In some embodiments, determining the transfer functions may be performed online. For instance, an HMD 100 including the bone conduction transducer assemblies 118 and vibration sensor assemblies 120 provides the generated reference signal and error signal to a computer server via a network connection, and the computer server estimates the transfer functions and processes the signals using the estimated the transfer functions to generate anti-crosstalk signals.

In some embodiments, the crosstalk cancellation controller 234 uses one or more adaptive filters to determine the transfer functions. The same process 400 can be repeated for a number of times to train the adaptive filter and update coefficients of the adaptive filter. With multiple iterations, the crosstalk cancellation controller 234 can further reduce (or completely cancel) the error signal, and thus provide improved crosstalk cancellation and spatial audio. Moreover, the same process 400 may be repeated with the bone conduction transducer assemblies 118 and vibration sensor assemblies 120 for both the left and right ear regions of the user using either the same or different adaptive filters.

In some embodiments, the crosstalk cancellation controller 234 determines to update transfer functions for the left and right sides of the user's head responsive to determining that a detected signal-to-noise ratio (SNR) is greater than a SNR threshold value for the left and right sides, respectively. Accordingly, the crosstalk cancellation controller 234 may simultaneously update the transfer functions (e.g., by training adaptive filters) for the left and right ear regions if the training signals for the left and right channels are weakly correlated. Responsive to determining that the SNR is not greater than the corresponding SNR threshold value (e.g., for stereo music applications having strongly correlated left and right channels), the crosstalk cancellation controller 234 may alternate between updating the transfer functions for noise propagation paths corresponding to the left and right sides. The crosstalk cancellation controller 234 may switch between the left and right sides on a time scale of 10-100 milliseconds, for example, such that a user wearing the HMD 100 is not able to perceive the switching while listening to audio provided by bone conduction transducers.

The steps of the process as described in FIG. 4 are merely illustrative. For example, generating 402 of the reference signal and generating 406 of the error signal can occur simultaneously instead of occurring sequentially as illustrated in FIG. 4. In some embodiments, the crosstalk cancellation controller 234 repeats the process 400 to update the transfer functions each time a user wears an HMD 100 even if the user previously used the same HMD 100 because the particular fitting of the HMD 100 on the user's head could vary between uses.

What is claimed is:

1. A head-mounted display (HMD) comprising:
a first vibration sensor configured to generate a reference signal representing first vibrations at a first ear region of a user caused by vibrations transmitted by a first bone conduction transducer;
a second bone conduction transducer configured to transmit first anti-crosstalk vibrations to a second ear region of the user in response to an anti-crosstalk signal;
a second vibration sensor configured to generate an error signal representing aggregate vibrations caused by the first vibrations and the first anti-crosstalk vibrations at the second ear region; and
a bone conduction signal generator coupled to the first vibration sensor to receive the reference signal, the bone conduction transducer coupled to the second vibration sensor to receive the first anti-crosstalk signal, the bone conduction signal generator configured to:
determine a first transfer function for a first noise propagation path of the first vibrations;
determine a second transfer function for a second noise propagation path of the second vibrations;
generate a modified version of the anti-crosstalk signal by processing the reference signal and the error signal using the first and second transfer functions; and
provide the modified anti-crosstalk signal to the second bone conduction transducer to transmit second anti-crosstalk vibrations that reduce the error signal at the second ear region.

2. The HMD of claim 1, wherein the second anti-crosstalk vibrations reduce another error signal at the second ear region, the other error signal being generated subsequent to the error signal.

3. The HMD of claim 1, wherein the first and second transfer functions are determined using an adaptive filter, and wherein generating the modified version of the anti-crosstalk signal comprises updating at least one coefficient of the adaptive filter.

4. The HMD of claim 3, wherein the bone conduction signal generator is further configured to estimate an impulse response of the reference signal using a least mean squares algorithm, and wherein updating the at least one coefficient is based on the estimated impulse response.

5. The HMD of claim 1, further comprising:
a first side arm contacting a first patch of skin of the user, the first bone conduction transducer and the first vibration sensor mounted on the first side arm; and
a second side arm contacting a second patch of skin of the user, the second bone conduction transducer and the second vibration sensor mounted on the second side arm.

6. The HMD of claim 1, wherein the bone conduction signal generator is further configured to:
generate a third anti-crosstalk signal using the first and second transfer functions; and
provide the third anti-crosstalk signal to the first bone conduction transducer to transmit third anti-crosstalk vibrations that reduce another error signal at the first ear region caused by crosstalk vibrations caused by the second bone conduction transducer.

7. The HMD of claim 6, wherein the bone conduction signal generator is further configured to provide a left bone conduction signal to the first bone conduction transducer, and provide a right bone conduction signal to the second bone conduction transducer, the left and right bone conduction signals causing spatial sound to be perceived by the user.

8. The HMD of claim 1, wherein the error signal and the modified anti-crosstalk signal have a same frequency and are out of phase.

9. The HMD of claim 1, wherein the first transfer function is determined using a first adaptive filter, the second transfer function is determined using a second adaptive filter, the first adaptive filter and the second adaptive filter having different coefficients.

10. The HMD of claim 9, wherein the bone conduction signal generator configured to:
responsive to determining that the error signal is greater than a threshold value, perform recalibration to update the first transfer function and to update the second transfer function.

11. A method comprising:
generating an reference signal representing first vibrations at a first ear region of a user caused by vibrations transmitted by a first bone conduction transducer;
transmitting, by a second bone conduction transducer, first anti-crosstalk vibrations to a second ear region of the user in response to an anti-crosstalk signal;
generating an error signal representing aggregate vibrations caused by the first vibrations and the first anti-crosstalk vibrations at the second ear region;
determining a first transfer function for a first noise propagation path of the first vibrations;
determining a second transfer function for a second noise propagation path of the second vibrations
generating a modified version of the anti-crosstalk signal by processing the reference signal and the error signal using the first and second transfer functions; and
providing the modified anti-crosstalk signal to the second bone conduction transducer to transmit second anti-crosstalk vibrations that reduce the error signal at the second ear region.

12. The method of claim 11, wherein the second anti-crosstalk vibrations reduce another error signal at the second ear region, the other error signal being generated subsequent to the error signal.

13. The method of claim 11, wherein the first and second transfer functions are determined using an adaptive filter, and wherein generating the modified version of the anti-crosstalk signal comprises updating at least one coefficient of the adaptive filter.

14. The method of claim 13, further comprising:
estimating an impulse response of the reference signal using a least mean squares algorithm, and wherein updating the at least one coefficient is based on the estimated impulse response.

15. The method of claim 11, further comprising:
generating another anti-crosstalk signal using the first and second transfer functions; and
providing the other anti-crosstalk signal to the first bone conduction transducer to transmit third anti-crosstalk vibrations that reduce another error signal at the first ear region caused by crosstalk vibrations caused by the second bone conduction transducer.

16. The method of claim 15, further comprising:
providing a left bone conduction signal to the first bone conduction transducer; and
providing a right bone conduction signal to the second bone conduction transducer, the left and right bone conduction signals causing spatial sound to be perceived by the user.

17. The method of claim 11, wherein the error signal and the modified anti-crosstalk signal have a same frequency and are out of phase.

18. The method of claim 11, wherein the first transfer function is determined using a first adaptive filter, the second transfer function is determined using a second adaptive filter, the first adaptive filter and the second adaptive filter having different coefficients.

19. The method of claim 18, further comprising:
responsive to determining that the error signal is greater than a threshold value, performing recalibration to update the first transfer function and to update the second transfer function.

* * * * *

UNITED STATES PATENT AND TRADEMARK OFFICE
CERTIFICATE OF CORRECTION

PATENT NO. : 10,070,224 B1
APPLICATION NO. : 15/685402
DATED : September 4, 2018
INVENTOR(S) : Antonio John Miller Page 1 of 1

It is certified that error appears in the above-identified patent and that said Letters Patent is hereby corrected as shown below:

In the Claims

Column 11, Claim 1, Line 47, delete "conduction transducer" and insert -- conduction signal generator --

Column 11, Claim 1, Lines 48-49, delete "the first anti-crosstalk signal," and insert -- the first anti-crosstalk vibrations, --

Column 12, Claim 11, Line 48, delete "an reference signal" and insert -- a reference signal --

Signed and Sealed this
Twenty-first Day of May, 2019

Andrei Iancu
*Director of the United States Patent and Trademark Office*